Figure 1:
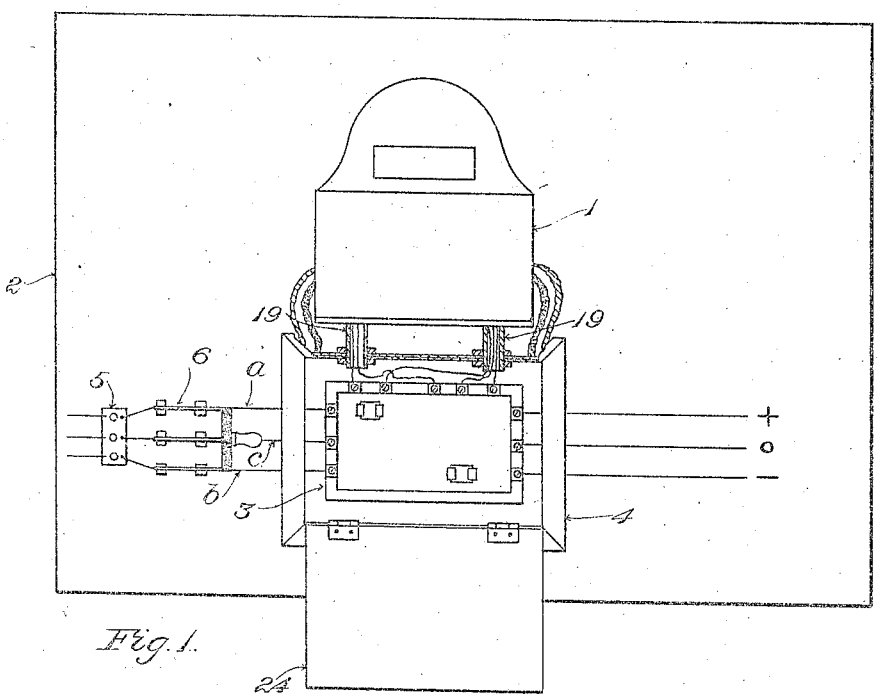

E. C. WIGHAM.
INCLOSED METER LOOP.
APPLICATION FILED APR. 19, 1909.

936,067.

Patented Oct. 5, 1909.

2 SHEETS—SHEET 1.

Witnesses:
Oscar F. Hill
Edith J. Anderson

Inventor:
Everett C. Wigham
by Chas. F. Randall
Attorney

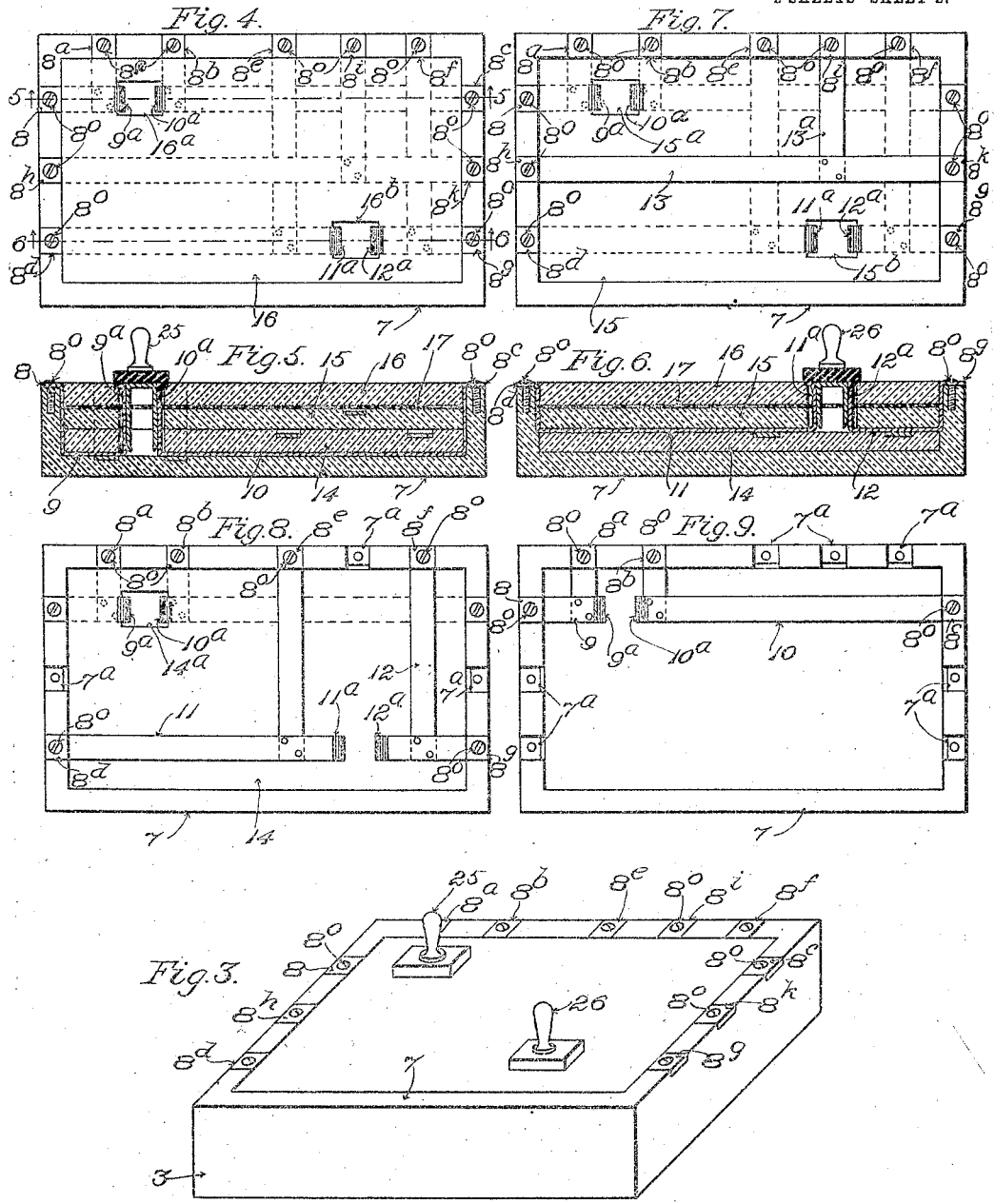

UNITED STATES PATENT OFFICE.

EVERETT C. WIGHAM, OF BOSTON, MASSACHUSETTS.

INCLOSED METER-LOOP.

936,067.

Specification of Letters Patent.

Patented Oct. 5, 1909.

Application filed April 19, 1909. Serial No. 490,852.

*To all whom it may concern:*

Be it known that I, EVERETT C. WIGHAM, a citizen of the United States, residing at Boston, in the county of Suffolk, State of Massachusetts, have invented a certain new and useful Improvement in Inclosed Meter-Loops, of which the following is a specification, reference being had therein to the accompanying drawings.

The invention consists in a meter-loop block having conveniently accessible contacts for connection to service, meter, and load, and in addition having meter-loops which are completely inclosed and insulated from one another and from their surroundings. Also, in the combination of a protecting casing or box therewith.

One object of the invention is to do away with the usual looping of wires at a meter, and secure a neater appearance adjacent the latter.

Another object thereof is to permit a lot of wires which it ordinarily is necessary to have about a meter to be dispensed with, and in addition enable a material saving of labor and time to be effected in setting and connecting-up a meter.

Another is to render it difficult or impossible to reverse the wires to run a meter backward without the fact being observed and detected.

Another is to enable the meter to be readily cut out, when desired, for the purpose of enabling the meter to be tested; and another is to enable the meter to be disconnected and the service suspended for a time without removal of the meter, and without danger of undetected surreptitious consumption of current.

An embodiment of the invention is shown in the drawings, in which latter,—

Figure 2:
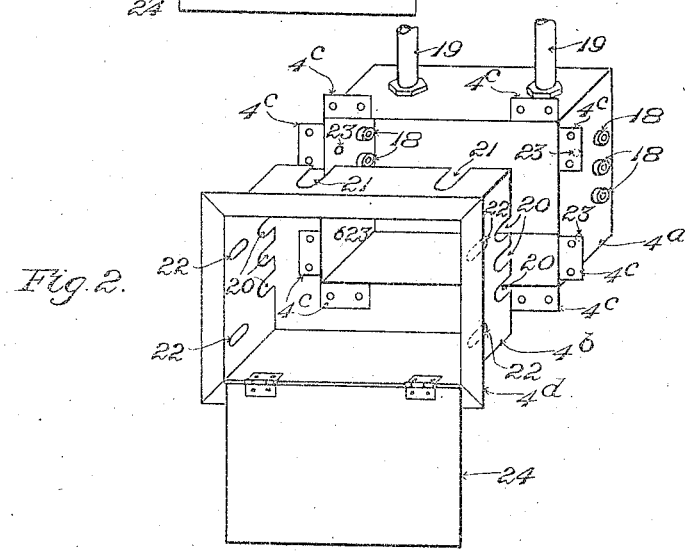

Figure 1 is an elevation of a meter-loop block and inclosing box therefor applied in connection with a meter, showing also the conductors. Fig. 2 is an isometric projection of the said box, on a larger scale than Fig. 1. Fig. 3 is an isometric projection of the meter-loop block, separately, and on a larger scale than Figs. 1 and 2, the plugs being shown in their sockets. Fig. 4 is a front elevation of the said block with the said plugs removed. Figs. 5 and 6 are views in section in the planes indicated by dotted lines 5, 5, and 6, 6, respectively, of Fig. 4, with the plugs in place in their respective sockets. Fig. 7 is an elevation of the said block, with the outermost plate or slab removed, and showing in full lines the neutral or potential bar and its branch to the corresponding contact for connection with the meter, the remaining connecting-bars being shown in dotted lines. Fig. 8 is an elevation of the block with the second plate or slab removed, showing the connecting-bars for the conductor *a* of Fig. 1 in full lines. Fig. 9 is an elevation thereof with the third plate or slab removed, and with the connecting-bars for the conductor *b* of Fig. 1 in full lines.

The illustrated embodiment of the invention is shown applied in connection with a 3-wire system, but is equally adapted to use with a 2-wire system, and the contacts are arranged to meet the various requirements encountered in practice, and to afford opportunity for changes of the connections to suit the wiring of different styles of meters.

Having reference to the drawings,—a meter is shown at 1, Fig. 1, a meter-board supporting the same being represented at 2.

At 3 is a meter-loop block embodying certain features of the invention, and 4 is an inclosing and protecting box therefor. The conductors of a 3-wire system are shown at *a*, *b*, *c*, cut-outs therefor being indicated at 5, and a switch at 6.

The meter-loop block, as shown in Figs. 3 to 9, comprises essentially a body-portion 7, a series of contacts 8, 8ᵃ, etc., a set of connecting bars 9, 10, 11, 12, and 13, and separating and covering slabs or plates 14, 15, 16. The body-portion 7 of the block is hollowed out to contain the connecting-bars and the slabs or plates. It is composed of insulating material, or else has insulating material applied in connection therewith, so as to prevent electrical communication from taking place through it between the parts which are applied to the same, or between such parts and their surroundings. By preference, it is made in one piece of porcelain by molding to the required shape, without seams or cracks, and in the form shown it has only the one opening into which the connecting-bars and separating and covering slabs or plates are placed. Seats for the contacts 8, 8ᵃ, etc., are provided on the edge of the shell of the body-block by forming recesses 7ᵃ, 7ᵃ, etc., in such edge, holes for the reception of the stems of the contact-attaching screws 8°, 8°, etc., being also formed in the shell in connection with such seats, as indicated in Figs. 5, 6, 8 and 9.

Referring more particularly to Fig. 9, the connecting-bar 9 employed between the conductor $a$ at the service side and the meter is formed of two pieces which are secured together at right angles, as shown also in dotted lines in Figs. 4, 7 and 8. The body of the said connecting-bar 9 is placed within the body-portion 7, in contact with the bottom or back of the latter. One of the pieces of which the said connecting-bar is composed is bent upon itself in two places so that both extremities thereof project outward at right angles from the main portion of the connecting-bar, as shown in section in Fig. 5. One of the said extremities fits within a recess in the end-wall of the body-portion 7 at the service side of the latter as in the said figure, and at its outer end is again bent at right angles to form the contact 8, which occupies one of the seats which are provided in the edge of such end-wall and is secured therein by a screw 8°. The other outwardly bent extremity, 9$^a$, of the piece referred to serves as a contact which is engaged by a plug to which reference will presently be made. The other piece forming a part of connecting bar 9 is bent at right angles so that a portion thereof extends outwardly within a recess in the top-wall of the body-portion, i. e., at the meter side of the latter, the said portion of such piece having a contact 8$^a$ which occupies a seat in the edge of such wall and is secured therein by a screw 8°. The connecting-bar 10 which is employed between the meter and the said conductor $a$ at the load side, is similar in character to connecting-bar 9, it also having the main portion thereof, which is contained within the body-portion 7, in contact with the bottom or back of the latter, and its end-portions bent outwardly, occupying recesses in the top wall of the body-portion at the meter side, and in the end-wall thereof at the load side, and provided with the contacts 8$^b$ and 8$^c$ which are secured by screws 8°, 8°, in seats in the edges of the said walls. The said connecting-bar 10 is also formed with an outwardly-projecting contact 10$^a$ adjacent the contact 9$^a$, adapted to be engaged by the plug aforesaid. The main portions of the connecting-bars 9 and 10 are covered by the slab or plate 14, which fits within the opening of the body-portion 7. The said plate has an opening at 14$^a$, through which the contacts 9$^a$, 10$^a$, project. It is intended to insulate such connecting-bars from the others, and may consist of porcelain or glass, or have insulating material applied in connection therewith.

Having reference more particularly to Fig. 8, the connecting-bar 11 employed between the conductor $b$ at the service side and the meter, and the connecting-bar 12 employed between the meter and the said conductor at the load side, are similar in character and general form to the connecting-bars 9, 10, already described. The said connecting bars 11 and 12 are contained within the opening of body-portion 7, with their main portions in contact with the slab or plate 14, and their end-portions contained within recesses in the end-walls and top-wall of such body-portion, the said end-portions having the contacts 8$^d$, 8$^e$, 8$^f$, 8$^g$, occupying seats in the edges of such walls and secured in such seats by screws 8°, 8°, etc. The connecting bars 11 and 12, respectively, are also formed with outwardly-projecting contacts 11$^a$, 12$^a$, adapted to be engaged by a plug as hereinafter explained. The slab or plate 15 fits within the opening of the body-portion 7, and covers the main portions of the connecting-bars 11 and 12. It has openings 15$^a$, 15$^b$, through which the respective pairs of contacts 9$^a$, 10$^a$, and 11$^a$, 12$^a$, extend outwardly, the said opening 15$^a$ corresponding in position with opening 14$^a$ of slab or plate 14.

Referring more particularly to Fig. 7, the connecting-bar 13 extends from the end-wall of the body-portion 7 at the service side, where it is connected to neutral conductor $c$ at such side, to the end-wall at the load side, where it is again connected to the said connector, and it has a lateral extension 13$^a$ extending to the top-wall and there having connected with it a wire from the meter. Its three extremities are bent outwardly and lie in recesses in the said walls, and are provided with the contacts 8$^h$, 8$^i$, 8$^k$, which are secured by screws 8°, 8°, 8°, in the respective seats therefor. The slab or plate 16 fits into the opening of the body-portion 7 outside of the connecting-bar 13, and covers the latter. It is formed with openings at 16$^a$ and 16$^b$ for the two pairs of contacts 9$^a$, 10$^a$, and 11$^a$, 12$^a$. The said openings correspond in position with openings 14$^a$, 15$^a$, and 15$^b$, of slabs or plates 14 and 15. The three slabs or plates may be grooved, substantially as shown in Figs. 5 and 6, to receive the main portions of the connecting-bars. To secure compactness and reduce the dimensions of the block, the connecting-bars are formed of flat strips of suitable metal.

In practice, I usually apply insulating cement to the slabs or plates as they are placed in the opening of the body-portion 7, for instance at or near the edges thereof, and I may apply a thick coating or layer as at 17, Figs. 5 and 6, between those marked 15 and 16. The sides of the opening or "sockets" containing the contacts 9$^a$, 10$^a$, and 11$^a$, 12$^a$. also may be coated. The purpose in making this application of insulating cement is to completely seal the block against the admission of moisture, and prevent access of the latter to any one of the connecting-bars. The block in its assembled condition is ready for connection with the conductors and with the meter, all that is required being to connect the conductors $a$, $b$, $c$, and short wires from the meter, to the different contacts 8, 8ª, etc., of the block, as in Fig. 1.

At 25, 26, Figs. 3, 5 and 6, are the plugs by which the meter may be cut out, as for the purpose of being tested, or when the operation of the meter is not desired, as in case a flat rate is charged the consumer, this result being secured by inserting the plug 25 between contacts 9ª and 10ª, and the plug 26 between contacts 11ª and 12ª, without disconnecting the wires connecting the meter with the block. The openings within which the said pairs of contacts are contained serve as sockets for the plugs.

The containing box 4 comprises an outer section or shell 4ª, Fig. 2, and an inner section or shell 4ᵇ, the latter telescoping into the former. The outer section or shell 4ª is, in practice, set in the wall on which the meter-board and meter are mounted. If necessary or deemed advisable, fastenings are applied to lugs 4ᶜ, 4ᶜ, etc., with which the said part is furnished, said lugs having holes for bolts, nails, screws or the like. Holes are made in the end-walls of the section or shell 4ª, for the passage of the conductors $a$, $b$, $c$, and are shown bushed with insulator tubes 18, 18, 18. To holes in the top wall of such section or shell are applied the lower ends of pipes 19, 19, extending up within the wall on which the devices, including the meter, are mounted and having the upper ends connected with outlet-boxes of approved character. Through these pipes extend the wires leading from the meter to the contacts of the meter-loop-block. A hole is cut in the meter-board of a size suitable to admit the inner section or shell 4ᵇ, and the latter is pushed into the said hole and within the outer section or shell until the flange 4ᵈ of the inner section or shell is brought against the outer face of the meter-board. The end-walls and top-wall of the inner section or shell are slotted at 20, 20, etc., and 21, 21, from the rear edge forward to receive the conductors, the projecting portions of the insulator tubes, and the pipes 19, 19. The said end-walls have slots 22, 22, made therein, extending horizontally in the direction from front to rear, to receive the stems of screws which are fitted to threaded holes 23, 23, in the end-walls of the outer section or shell. Such screws serve, when tightened up, to clamp the inner section or shell in place. The slots permit the position of the inner section or shell to vary with relation to that of the outer one.

At 24 is a door which is hinged to the front of the inner section or shell, and by means of which the inclosing box may be closed. By sealing this door in closed condition, undetected unauthorized access to the meter-loop block will be prevented.

As will be perceived in Fig. 1, the pipes 19, 19, are secured in the top-wall of the outer or fixed section or shell of the box, so that the wires leading from the block to the meter are accessible only within the box, between the lower ends of such pipes and the top of the block, which is fixed in position to the back wall of the outer section or shell. Consequently the only opportunity for tampering with the wires is within the box. As also will be seen in Fig. 1, only short portions of the wires leading from the meter-loop block are exposed within the inclosing box. Consequently, any rearrangement of the wires for the purpose of reversing the meter will be plainly apparent and easily detected when the door is opened. Should it be desired to discontinue service for a time, this can readily be effected very quickly by making disconnection within the box at the contacts, to which the meter-wires are connected, leaving the meter undisturbed in position, and by closing and sealing the door any undetected tampering with the devices will be prevented. Service can be restored at any time with equal facility and promptness.

As will be apparent to those who are skilled in the art, the described meter-loop block is equally adapted for use with 3-wire systems or 2-wire systems, and the arrangement of connecting-bars and contacts enables me to utilize the said block either, as shown, on a 3-wire system with a neutral wire and two wires leading in and two leading out, or on a 2-wire system with a neutral wire and one wire in and one wire out, or without a neutral wire and with two wires in and two wires out.

What is claimed as the invention is:—

1. A meter-loop block comprising connecting-bars having contacts for connection with service, meter, and load, incased in insulating material with the poles of opposite polarity insulated from each other by intervening layers of insulating material.

2. A meter-loop block comprising a hollow body-portion with closed back or bottom, meter-loops having contacts at their respective ends for service, meter, and load connections, and layers of insulating material contained within said body-portion insulating the poles of opposite polarity from each other.

3. A meter-loop block comprising a hollow body-portion of molded porcelain having a closed back or bottom, meter-loops having at their respective ends contacts for service, meter, and load connections, and slabs or plates of porcelain between the poles of opposite polarity insulating such meter-loops from one another.

4. A meter-loop block comprising connecting-bars 9 and 10, 11 and 12, the first-mentioned of each pair having contacts at its service-end and meter-end, respectively, and the other of each pair having contacts at its meter-end and load-end respectively, an insulating casing, and layers of insulating material insulating the respective pairs from each other.

5. A meter-loop block comprising connecting-bars 9 and 10, 11 and 12, the first-mentioned of each pair having contacts at its service-end and meter-end, respectively, and the other of each pair having contacts at its meter-end and load-end respectively, a connecting-bar 13 having contacts for service, meter, and load, an insulating body inclosing the said connecting-bars, and layers of insulating material insulating the respective pairs and connecting-bar 13 from one another.

6. The combination with a meter-loop block comprising connecting-bars 9 and 10, 11 and 12, the first-mentioned of each pair having contacts at its service-end and meter-end, respectively, and the other of each pair having contacts at its meter-end and load-end respectively, an insulating casing, and layers of insulating material insulating the respective pairs from each other, and a plug for each pair of connecting-bars, to electrically bridge such pair and thereby cut out the meter.

7. The combination with a meter-loop block comprising connecting-bars 9 and 10, 11 and 12, the first-mentioned of each pair having contacts at its service-end and meter-end, respectively, and the other of each pair having contacts at its meter-end and load-end respectively, a connecting-bar 13 having contacts for service, meter, and load, an insulating body inclosing the said connecting-bars, and layers of insulating material insulating the respective pairs and connecting-bar 13 from one another, and a plug for each pair of connecting-bars, to electrically bridge such pair and thereby cut out the meter.

8. The combination with a meter-loop block, conductors, a meter, and wires connecting such meter with said meter-loop block, of an inclosing box for said block within which the connection between such conductors and wires and the block is made, and closed conduits between the meter and the box within which the wires are protected from access thereto.

9. The combination with a meter-loop block, conductors, a meter, and wires connecting such meter with said block, of an inclosing box for the block within which the connection between the latter and the conductors and wires is made, said box comprising one section that is adapted to be fixed in place, and a second section telescoping with the first and provided with a movable door affording access to the interior of the box, and closed conduits between the meter and the fixed section within which the wires are protected from access thereto between the meter and the box.

10. A meter-loop block comprising a pair of connecting-bars, one thereof having contacts at its service-end and meter-end, respectively, and the other thereof having contacts at its meter-end and load-end, respectively, a connecting-bar having contacts for service, meter, and load, layers of insulating material insulating the said connecting bars from one another, and an inclosing insulating body.

In testimony whereof I affix my signature in presence of two witnesses.

EVERETT C. WIGHAM.

Witnesses:
CHAS. F. RANDALL,
EDITH J. ANDERSON.